March 22, 1949.  W. L. HANSEN ET AL  2,465,224
ELECTRIC MOTOR
Filed Oct. 13, 1945
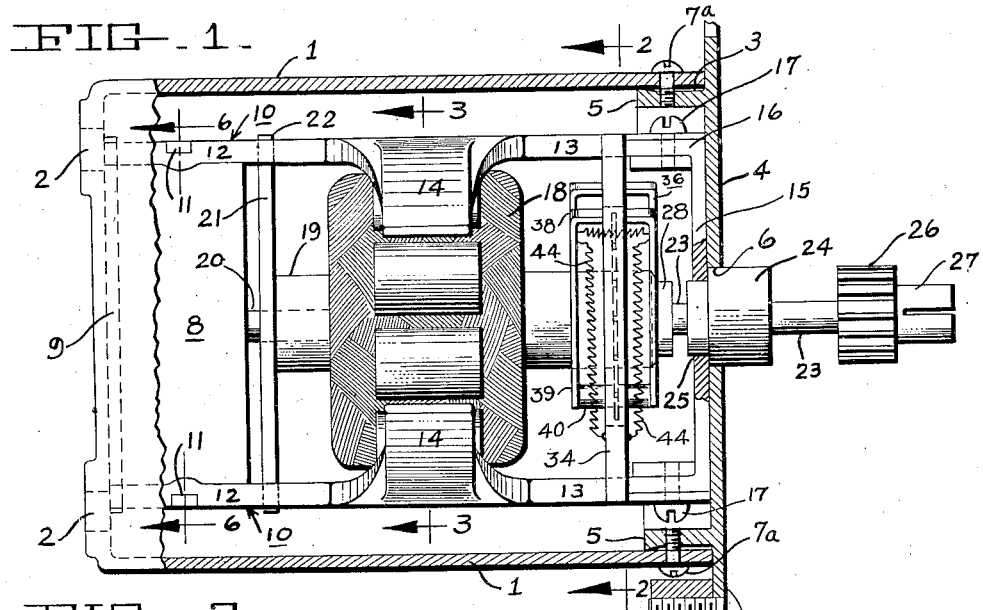
FIG-1.
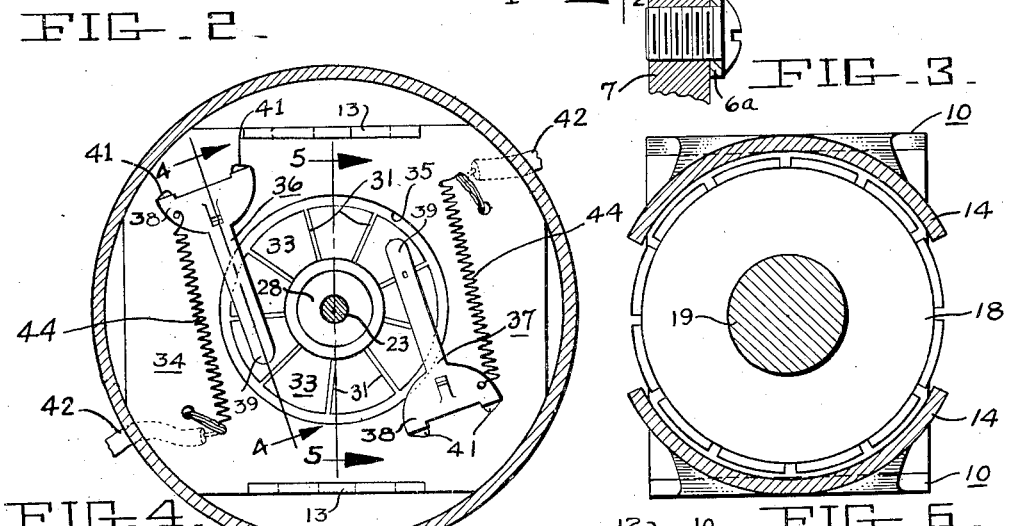
FIG-2.  FIG-3.  FIG-4.  FIG-6.
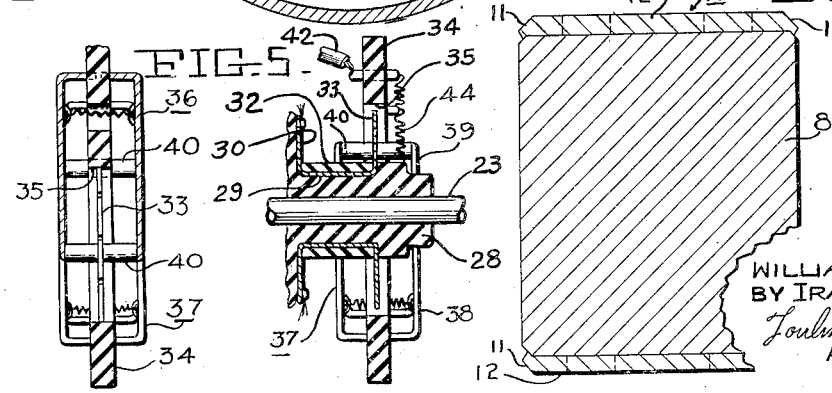
FIG-5.
INVENTOR
WILLIAM L. HANSEN
BY IRA N. HURST
Toulmin & Toulmin
ATTORNEYS Patented Mar. 22, 1949

2,465,224

UNITED STATES PATENT OFFICE 2,465,224

ELECTRIC MOTOR

William L. Hansen and Ira N. Hurst, Princeton, Ind., assignors to Hansen Manufacturing Company, Inc., Princeton, Ind., a corporation of Indiana Application October 13, 1945, Serial No. 622,146

4 Claims. (Cl. 172—36)

1

The present invention relates to direct current motors and more particularly to those of the fractional horsepower type.

The use of servo control mechanism in the operation of airplanes and accessories often requires a small direct current motor of high efficiency but more particularly of high dependability because such motors are sometimes located in inaccessible places where they are not apt to be frequently inspected. Sometimes the entire operation of the plane or its accessory may depend on the ability of the small motor to perform its exacting work over long periods of time without deterioration. Such motors must also be run from storage batteries in case they are used in airplane installations so that their efficiency must be high in order to require the minimum amount of operating current. Most direct current motors are not suited to these exacting conditions because such motors require commutators, brushes, etc. which in the event that the current density is large as when the motor is temporarily overloaded, sparking may occur at the commutator which in time would render the motor unfit for further service. Other motors are disqualified for this particular kind of work in view of their comparatively large bulk for the amount of power delivered because such motors invariably have to be positioned in out-of-the-way places where the space is extremely limited. Other disadvantages attendant the use of earlier motors are that they do not lend themselves to electromagnetic and electrostatic shielding nor is it possible to seal the motor within a dust-proof or oil-proof casing.

The primary object of the invention is to provide a small motor of high efficiency notwithstanding the small parts involved.

Another object is to provide a fractional horsepower motor with an improved commutating arrangement which will permit the application of relatively large quantities of current as when the motor is temporarily running an overload and yet no harm will be done to the commutator through sparking and no excessive heat will be developed.

Still another object is to provide a motor of this character which can be readily contained in electrostatic and electromagnetic shield and which will be sealed from dust and oil.

The final object is to provide a motor which can be inexpensively made and readily assembled to form a rugged dependable actuator notwithstanding the small size of the parts involved.

These objects are attained in brief by employing a highly magnetized bar magnet for the field and utilizing the pole pieces as part of the mounting for the bar magnet. In addition, an improved commutator is provided which is set edgewise of the shaft so that both sides can be exposed to parallelly connected brushes and these brushes are mounted on a sheet of insulating material which is supported from the same frame out of which the pole pieces are formed.

Further objects and features will be apparent as the specification is perused in connection with the accompanying drawings in which:

Figure 1 represents a longitudinal section of the improved motor but with a few parts shown in elevation for clearness.

Figure 2 is a sectional view taken along line 2—2 in Figure 1, while Figure 3 is a transverse view taken through the pole pieces as indicated by the line 3—3 in Figure 1.

Figure 4 is a detail sectional view taken through a set of parallelly connected brushes at about the line 4—4 in Figure 2, while Figure 5 is a fragmentary sectional view taken through the commutator at line 5—5 in Figure 2.

Figure 6 is a transverse section through the permanent magnets taken along line 6—6 in Fig. 1.

In Figure 1, reference character 1 designates a cylindrical casing closed at one end except for small openings 2 and open at the other end as indicated at 3. The open end of the casing is eventually closed when the motor parts have been inserted within the casing by a cover plate 4 having a shoulder 5 which fits loosely into the casing and is provided with a central opening 6 for purposes which will be explained presently. The cover plate 4 has an extension indicated at 6a which may be screwed to a support bracket 7 in order to position the motor with respect to the work to be performed. The shoulder 5 of the cover plate may be screwed, as indicated at 7a, to the casing 1. The casing parts 1 and 4 are preferably made of a light metal such as aluminum which is non-magnetic in order not to disturb the magnetic field within the motor and being a good conductor, the casing will serve as an efficient electrostatic shield for impulses derived from sources within the casing or from positions outside the casing.

*Magnetic field structure*

The field of the motor is formed of a relatively heavy block of magnetizable metal, indicated at 8, which may be Alnico, and this block is spaced from the bottom of the casing by a brass plate 9. Pole pieces 10 of a strong magnetizable metal are secured to opposite ends of the magnet 8 and the latter is held between the pole pieces by a small crimp, indicated at 11, formed in the pole pieces which overlap the edges of the magnet. These pole pieces, generally indicated at 10, extend substantially the entire length of the casing as a unitary member and are formed with two end portions 12, 13 of substantially rectangular configuration joined together by an intermediate portion 14 which takes a general arcuate form as shown in Figures 1 and 3. It will be noted in these figures that the arcuate pole piece portions extend for a considerable distance around each side of the armature.

At the cover end of the motor, the pole piece portions are spanned by a brass plate 15 provided at each end with a cutaway flange 16 which is adapted tightly to receive a tongue formed on the portions 13 and which can be screwed, as indicated at 17, to the brass member 15. The last-mentioned member may have a centrally bent-over tab at each end and between the two flange projections in order to receive the screws. Thus, the pole pieces are spaced apart at one end by the brass plate 9 and at the other end by the brass plate 15 which, together with the pole pieces, constitutes a box-like frame of rugged construction.

*Armature and shaft mounting*

The armature 18 may be of the ordinary wound type in which the coils are carried through slots formed in a stack of laminations, these laminations exposing a series of pole faces which are spaced quite closely to the field poles 14. The armature is carried on a relatively heavy shaft 19 which has a turned-down portion 20 at one end to leave a shoulder for bearing against a brass plate 21 which is secured to the opposite field pole pieces, indicated at 22. The other end of the shaft is also provided with a turned-down portion 23, as shown in Figure 5. The bearing for the shaft portion 23 is constituted of a sleeve 24 which fits tightly into the opening 6 of the cover plate and has a short shouldered portion 25. The shaft continues through the bearing 24 and is provided with a pinion 26 which is secured to the shaft through a split extension 27 which can be compressed about the shaft. Thus, the motor shaft is journaled at one end in the brass plate 21 and at the other end in the sleeve 24 which is contained within the cover plate 4. This sleeve provides a relatively long length of bearing surface to take up any stresses that might be caused when the pinion 26 meshes with the teeth of the cooperating gear.

*Armature and brush mechanism*

Surrounding the shaft portion 23 immediately adjacent the armature winding 18, there is a sleeve 28 (Fig. 5) which has a circular recessed portion, indicated at 29. There are a plurality of U-shaped tab pieces 30, preferably of copper, laid around the periphery of the circular recess 29, these tabs being separated from an another, as indicated at 31. Electrical connections are taken from the inner radially extending tab portions to the various windings on the armature while the outer radially extending tab portions are left free to constitute a disc-like commutator. The U-shaped tab members are held securely in position about the periphery of the member 28 by means of a tightly fitted sleeve 32 of insulating material which can be applied in split form and the two halves of the sleeve secured together in any suitable and well-known manner. Thus, the commutator portion, designated 33, is distinguished from the other tab portion to which electrical connections are made, in that it constitutes a disc-like element extending radially away from the insulated member 28 and the various segmental parts of the commutator are separated from one another by the spacings 31. As the shaft 23 rotates, it carries the sleeve members 28 and also the commutator segments or tabs 33 which are insulated from one another and from the shaft but are individually connected to the armature windings.

The brush gear is supported on a rigid plate 34 of insulating material such as fiber which preferably has a rectangular shape and is rounded off at the corners to fit within the casing 1. A large opening 35 is provided at the center of plate 34, this opening readily clearing the outside diameter of the commutator segments. Two pairs of brushes 36, 37 are disposed on opposite sides of the shaft 23 (Fig. 2) and also on opposite sides of the commutator tabs 33. Thus, four brushes are used, of which two brushes at each side of the shaft are connected in parallel to opposite sides of the line. These brushes are preferably made of thin stock brass and are formed with a semi-circular portion 38 at one end which extends into a long narrow strip portion 39. The portions 39 carry a pair of inwardly projecting contacts 40 which are adapted to bear against the tabs 33 on both sides of the commutator. The portions 38 of each set of the strip brushes are secured to the fiber plate 34 in any suitable manner, for example, by providing pairs of openings, indicated at 41, through which small tongues project and are bent over at each end so as to be soldered to the brush portions 38. Due to the springy character of the material out of which the brushes 39 are made, the brushes can be caused to press lightly but firmly against each side of the respective commutator tabs 33. As stated hereinbefore, the brush element of each pair are connected in parallel through the tongues which extend into the fiber plate 34. In order to make contact with the brushes 38 and the outgoing conductors 42, openings through the plate 34 are provided and the conductors extend to receive flexible conductors 44 which may be secured at one end to the respective brushes and at the other end to the outgoing wires.

It is therefore apparent that each brush set of two strips are caused to bear through their contacts 40 against opposite sides of the composite disc-like commutator and are held in this contact relation against the commutator by the flexible character of the brush material. Inasmuch as they are connected in parallel, it is possible to carry considerable amounts of current from or to the commutator tabs 33 without undue heating, notwithstanding the thinness of the material from which the brushes are made.

In the assembly of the motor, the armature is first inserted in position while the brass plate 15 is removed. The next step in assembling the motor is to insert the fiber plate or disc 34 to which the brushes and conductors have been affixed, care being taken in prying open the contacts 40 in order to grip opposite sides of the disc commutator. The brass plate 15 is then applied in position and held fast by the screws 17 as was explained hereinbefore. The entire motor assembly can then be placed in the casing 1 after which the cover 4 is affixed in position by the screws 7. The conductors leading to each brush set are taken through the openings 2.

A motor of the character described is rugged in construction and quite inexpensive to manufacture since the field structure comprises simply a bar magnet and the field poles 14 constitute the side members of the frame. The motor is efficient in operation inasmuch as the arcuate portions 14 of the field poles extend over a large part of the armature poles and the air gap between the armature and the field poles can be predetermined quite accurately even when the motors are being made on a large production basis. This is because the frame on which the field poles constitute a part is very rigid and the armature is caused to rotate in bearings which also form part of the frame. The brushes 39 or rather their contact portions 40 bear against opposite sides of the armature and serve to give a stabilizing effect to the relatively thin commutator tabs in addition to providing a current path of relatively low resistance in conveying the energizing current to the motor.

It is apparent that while we have described the device as a motor to be used under the exacting conditions found in airplane work, it is apparent that the same device could be used as a small generator by simply rotating the armature in any suitable and well-known manner.

It will be understood that we desire to comprehend within our invention such modifications as come within the scope of the claims and the invention.

Having thus fully described our invention, what we claim as new and desire to secure by Letters Patent is:

1. A rotary electrical translating device comprising an open frame closed at one end by a permanent magnet and at the other end by a non-magnetic plate, the longitudinal member of said frame being formed of magnetizable material having portions at the middle which comprise pole pieces for extending around the magnetic faces of an armature, said armature being mounted on a shaft which is journaled in said frame, a disc-like commutator mounted on the shaft and extending radially therefrom, and brushes extending in the same direction as the commutator and pressing against opposite sides of the commutator for delivering current to or from said armature, said commutator being formed of tabs of an angular cross-section insulatingly secured at one leg of each tab to said shaft and separated from one another to leave an insulating space between the adjacent other legs of the tabs which extend radially from the shaft.

2. An electrical motor including a magnetic field formed of a permanent magnet, pole pieces extending from opposite ends of said magnet to positions about the pole faces of an armature, a shaft for carrying said armature, a commutator composed of a plurality of segments arranged edgewise about said shaft so that the segments extend radially outward from the shaft, and brushes extending in the radial direction with respect to the shaft and bearing against opposite sides of said segments, said commutator being formed of tabs of an angular cross-section insulatingly secured at one leg of each tab to said shaft and separated from one another to leave an insulating space between the adjacent other legs of the tabs which extend radially from the shaft.

3. A rotary electrical translating device comprising a pair of field poles arranged on opposite sides of an armature, said armature being mounted on a shaft, a permanent magnet extending across the pair of field poles at one end of the armature and a disc-like commutator secured to the shaft at the other end of the armature and projecting normally from said shaft, and a set of brushes for conveying current to and from said commutator, said set being positioned partially on one side of the commutator and partially on the other side of the commutator all of said sets of brushes extending in the same direction as the disc-like commutator, said commutator being formed of tabs of an angular cross-section insulatingly secured at one leg of each tab to said shaft and separated from one another to leave an insulating space between the adjacent other legs of the tabs which extend radially from the shaft.

4. A rotary electrical translating device comprising a pair of circularly shaped field poles arranged on opposite sides of an armature and terminating in arcuate portions which subtend a considerable part of the armature, means including a permanent magnet for magnetically energizing the field poles, said poles being spaced apart at one end by said permanent magnet and at the other end by a plate member, said plate member carrying a pair of brush sets which bear against a disc-like commutator on both sides thereof and extending in the same direction as the commutator, said armature being mounted on a shaft and said commutator being secured edgewise to the shaft, said commutator being formed of tabs of an angular cross-section insulatingly secured at one leg of each tab to said shaft and separated from one another to leave an insulating space between the adjacent other legs of the tabs which extend radially from the shaft.

WILLIAM L. HANSEN.
IRA N. HURST.

REFERENCES CITED

The following references are of record in the file of this patent:

UNITED STATES PATENTS

| Number | Name | Date |
| --- | --- | --- |
| 467,318 | Thomson | Jan. 19, 1892 |
| 837,213 | Fuld | Nov. 27, 1906 |
| 1,811,180 | Landers | June 23, 1931 |
| 2,177,472 | Barrett | Oct. 24, 1939 |